March 10, 1970 M. J. LAURO 3,499,363
WEAPONS CONTROL SYSTEM
Original Filed Oct. 18, 1965 10 Sheets-Sheet 1
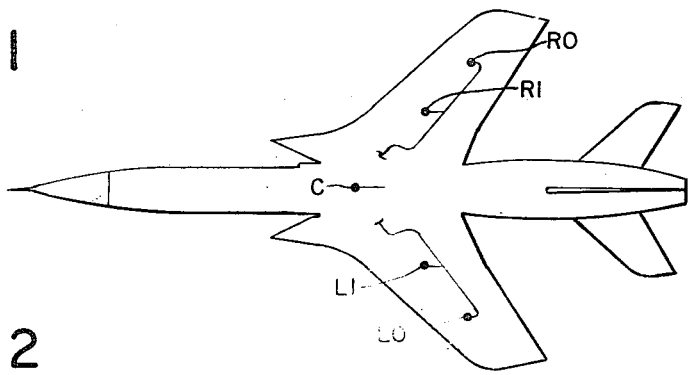
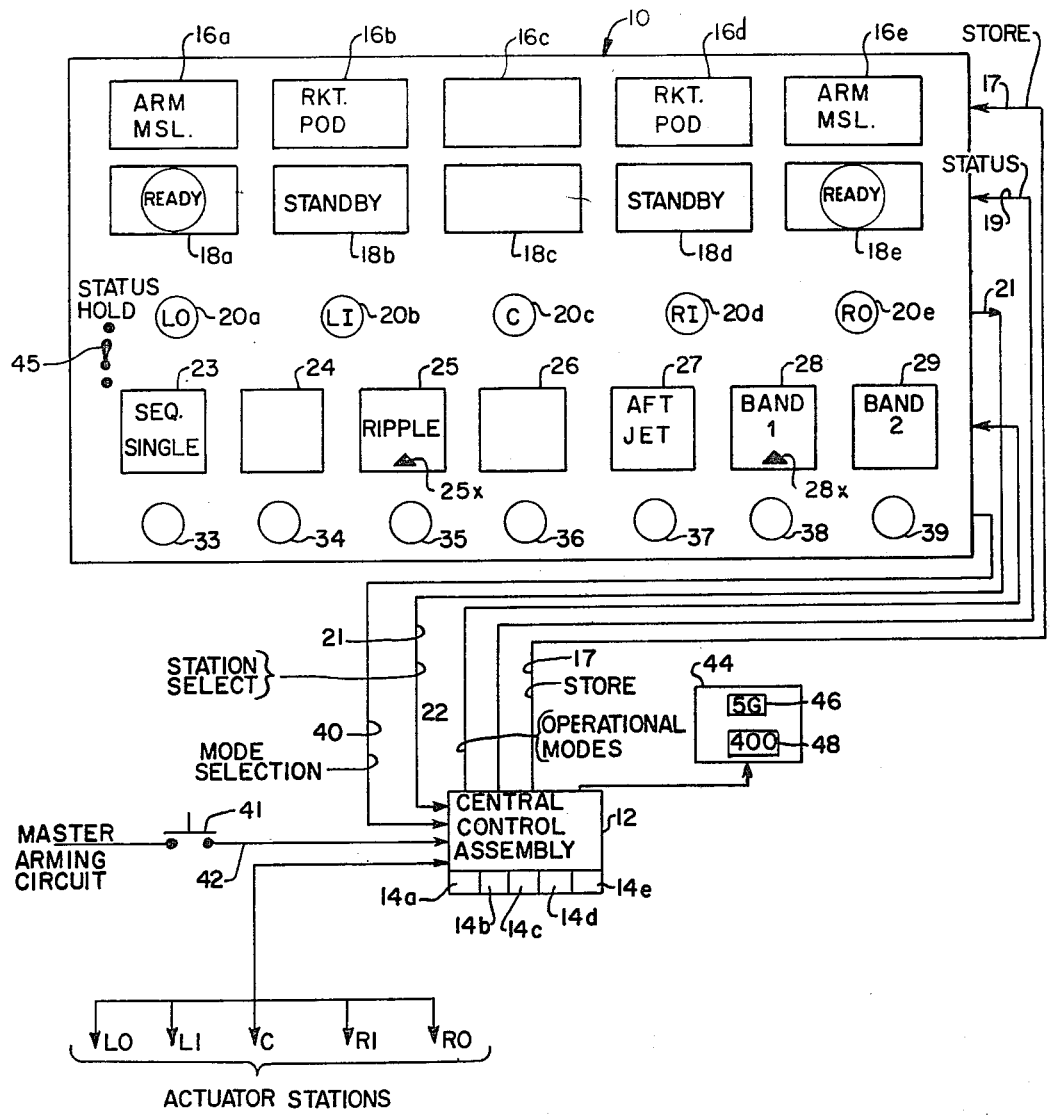

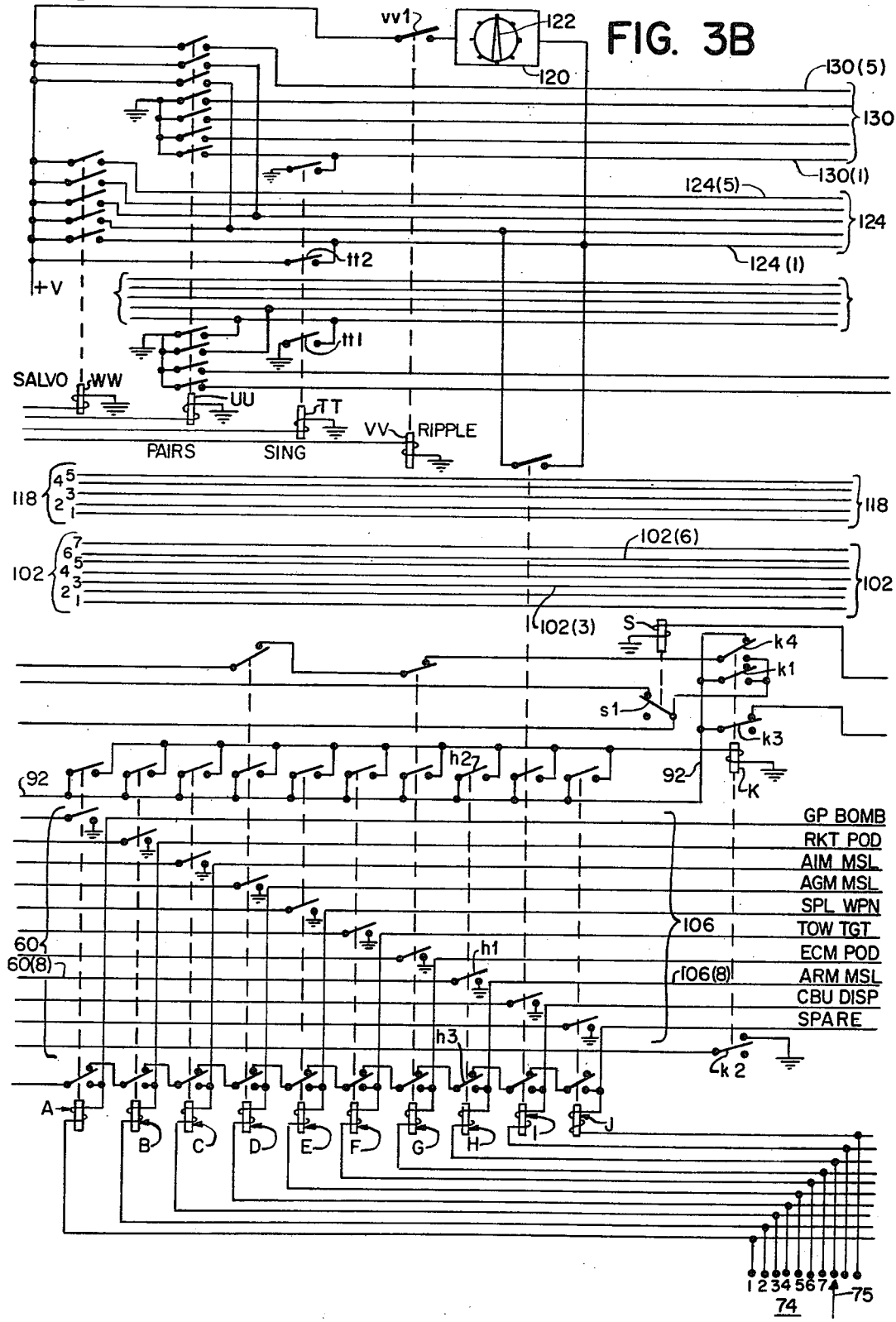

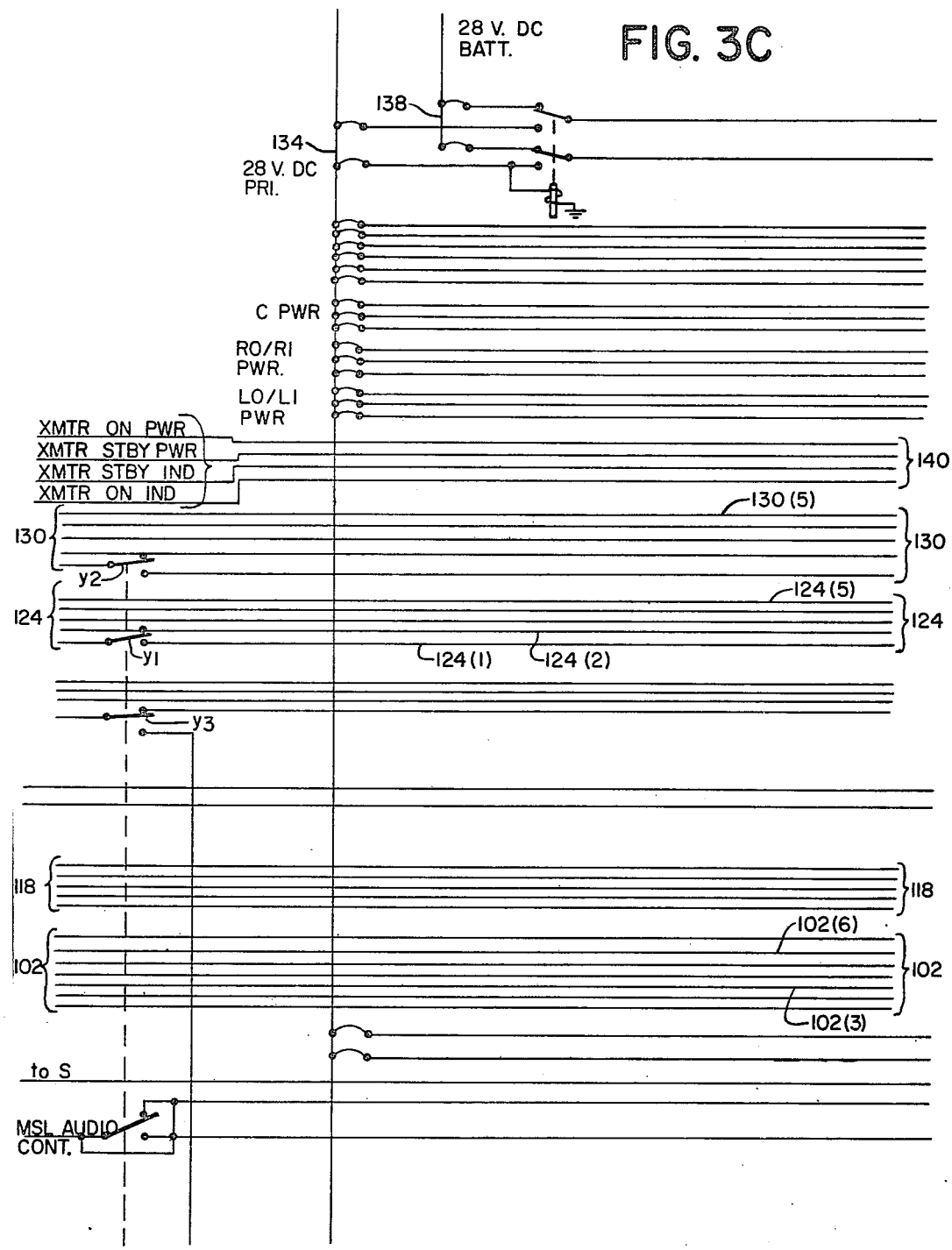

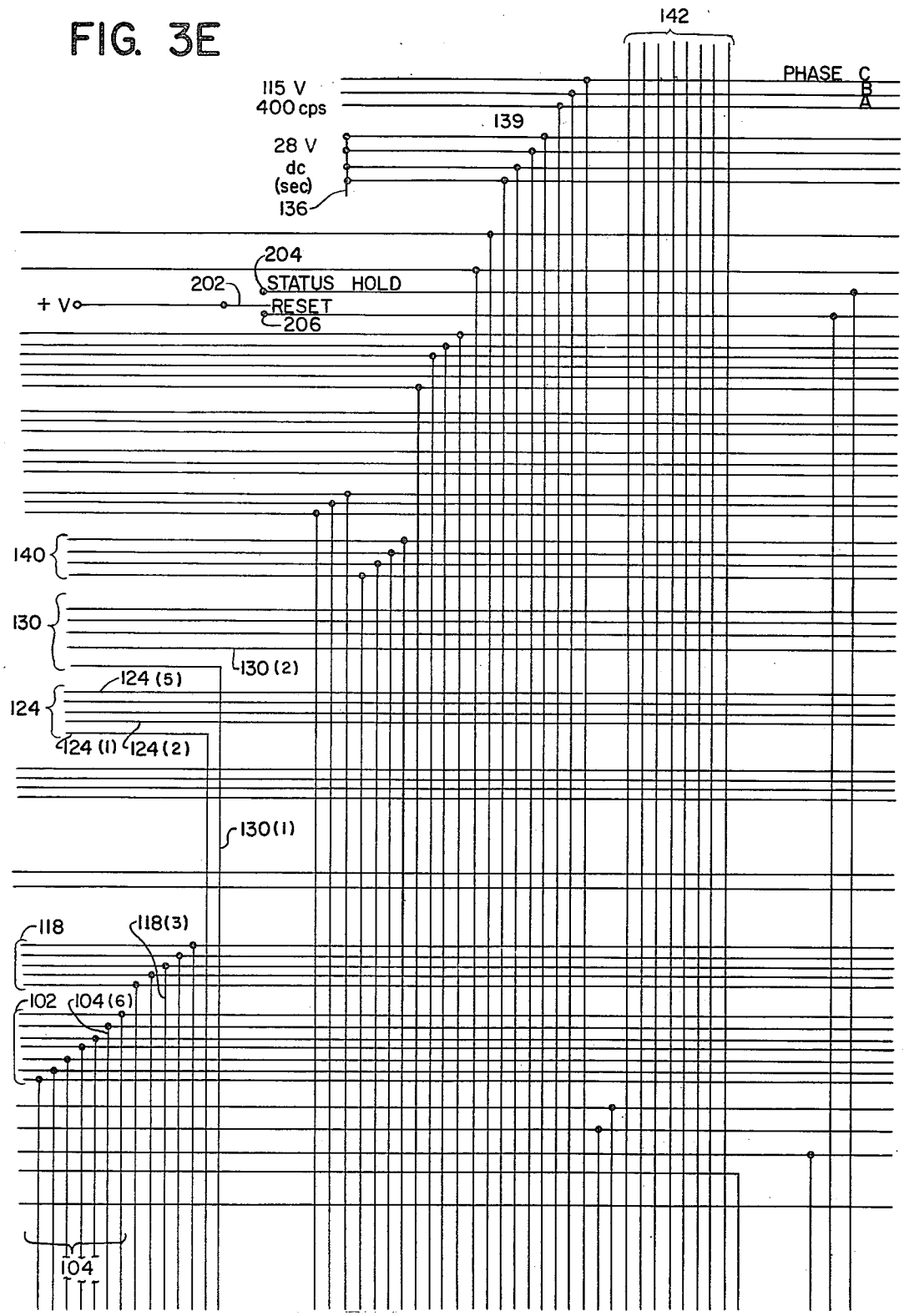

March 10, 1970     M. J. LAURO     3,499,363
WEAPONS CONTROL SYSTEM

Original Filed Oct. 18, 1965     10 Sheets-Sheet 8

United States Patent Office 3,499,363
Patented Mar. 10, 1970

3,499,363
WEAPONS CONTROL SYSTEM
Michael J. Lauro, Brentwood, N.Y., assignor to Fairchild Hiller Corporation, Farmingdale, N.Y., a corporation of Maryland
Continuation of application Ser. No. 507,980, Oct. 18, 1965. This application Jan. 21, 1969, Ser. No. 796,283
Int. Cl. F41f 5/00, 5/02, 3/04
U.S. Cl. 89—1.5                           29 Claims

ABSTRACT OF THE DISCLOSURE

A weapons control system for use with an aircraft having a plurality of weapon firing stations, comprises a central control assembly which may be programmed by a plurality of plug boards each corresponding to one of the stations. According to the programming of the control assembly, a visual display within the cockpit identifies the weapons loaded at each of the stations as well as the status of such weapons. When a particular weapon is selected for firing, an additional visual display, controlled by the control assembly, provides a visual display of each of the possible operational modes of the weapon. Thereafter, any of the displayed operational modes may be selected by the pilot so as to enable operation of the selected weapon pursuant to the selected mode.

---

This is a continuation of application Ser. No. 507,980, filed Oct. 18, 1965, now abandoned. The present invention relates to apparatus for controlling the operation of a plurality of independent actuator stations, each of which is designed to release or operate various stores such as weapons or the like.

The wide variety of sophisticated weapons developed in the recent past has complicated the task of firing them from aircraft to such a point that the basic utility of these weapons is in danger of being seriously compromised. Furthermore, due to the wide variety of unrelated weapons required by modern warfare, the use of newly designed weapons frequently requires the installation of new control circuits, thus necessitating costly rewiring of the aircraft. Even the mere substitution of one conventional weapon for another generally requires removal of existing control panels and replacement with new control panels with which the pilot may not be familiar.

Such rewiring of the aircraft is a drawback for which a solution has long been sought; but perhaps even more serious is the mental strain to which the pilot is subjected in remembering precisely what stores have been loaded and where they are located; which weapons have been fired or released, and which have not; the location of the controls and the available operational modes of releasing the selected stores; and other related data with which those skilled in the art will be familiar. In addition to the above, the pilot must continually be aware of the flight restrictions the selected stores impose upon the aircraft, and the extent to which such restrictions change. Thus, depending upon the weapons stored at the various locations the aircraft must not exceed a predetermined velocity and acceleration. As the various stores are released these restrictions will change, and updating these restrictions under conditions of warfare is exceedingly difficult.

Accordingly, it is a main object of the present invention to provide a weapons control system which simplifies the release of individual weapons or stores without reducing the utility of the stores.

Another object of the invention is to provide a control system for a plurality of actuator stations wherein regardless of the store located at each station an indication may be had of the various operational modes of the store.

Another object of the invention is to provide a weapons control system which does not require replacement of control panels or substantial rewiring to accommodate new weapons, whether or not yet developed.

Another object of the invention is to provide a weapons control system for an aircraft, wherein the cockpit space required for the control panels is substantially reduced.

Still another object of the invention is to provide a weapons control system capable of controlling and displaying the operation of a wide variety of stores.

Yet another object of the invention is to provide a control system of the type described wherein means are provided for displaying the store located at each station and the status of such stores.

Yet another object of the invention is to provide a weapons control system capable of displaying the various flight restrictions imposed by the loaded stores, which retsrictions are continually updated to account for the release of such stores.

Briefly, in accordance with the invention, the above and other objects are accomplished by the cooperation of a programmed control assembly and a unique control panel containing display means. The control assembly is programmed depending upon the stores located at the various aircraft stations, and the display means, in response to such programming, automatically displays the nature and status of the store located at each of the stations. When it is desired to operate a selected store, a switch or the like corresponding to the selected station is actuated thereby causing the program control assembly to actuate a further display of the various operational modes available for that selected store. The pilot by observing the display may then select the displayed operational mode(s) to operate the given store through the programmed control assembly in accordance with the selected mode(s).

The display may further include the flight restrictions measured in G's and knots which are computed through the cotnrol assembly and will change as the various stores are released. In addition, each change in status of the various weapons may be displayed throughout the entire arming and firing process until actual release, at which time the display for the released store is wiped out. Because of the novel cooperation of the display and central control assembly, when a new weapon is inserted at any of the given stations, it is merely necessary to program the control assembly depending upon the nature of the store and no further changes in the internal wiring of the aircraft are necessary. At worst, it is only necessary to change the display units.

The manner in which the invention accomplishes the desired objects can be understood more fully herein below with reference to the attached drawings, wherein:

FIGURE 1 is a representative showing of a typical aircraft with which the invention has utility;

FIGURE 2 is a block diagram used for explanatory purposes and illustrating in general terms the cooperation of the display and control assembly;

Figure 5:
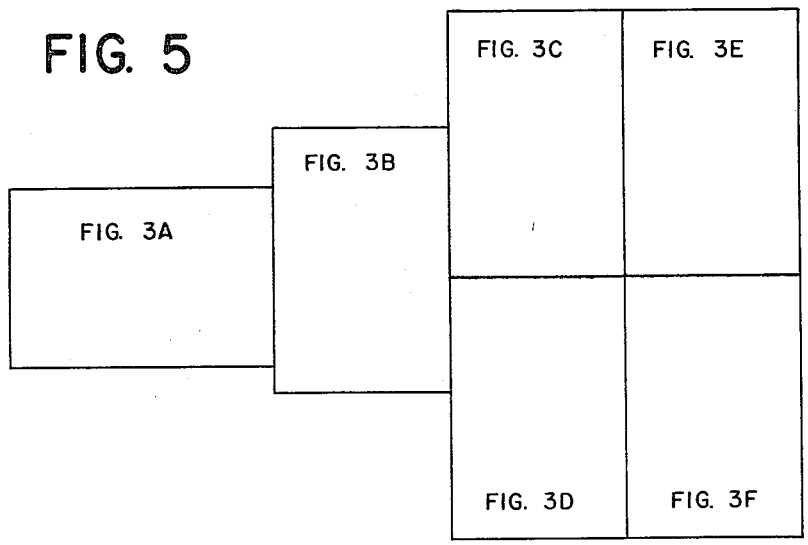
Figure 4:
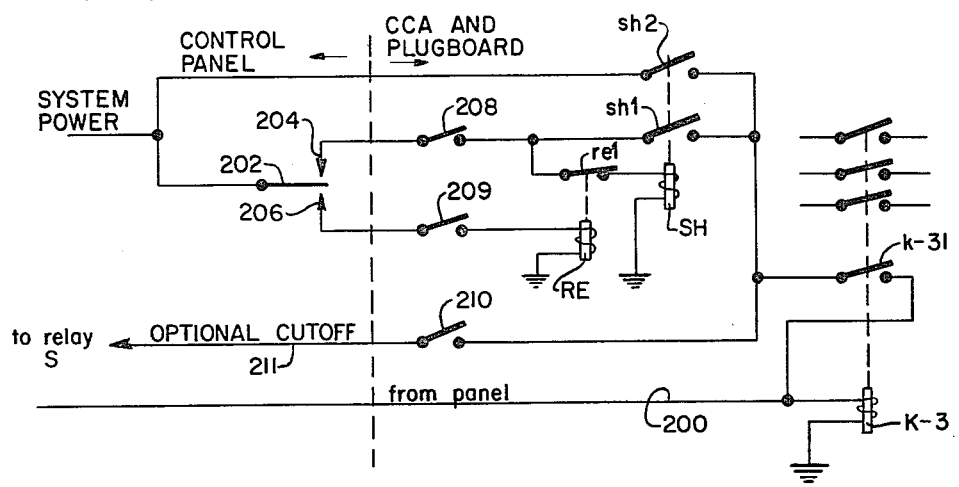
Figure 6:
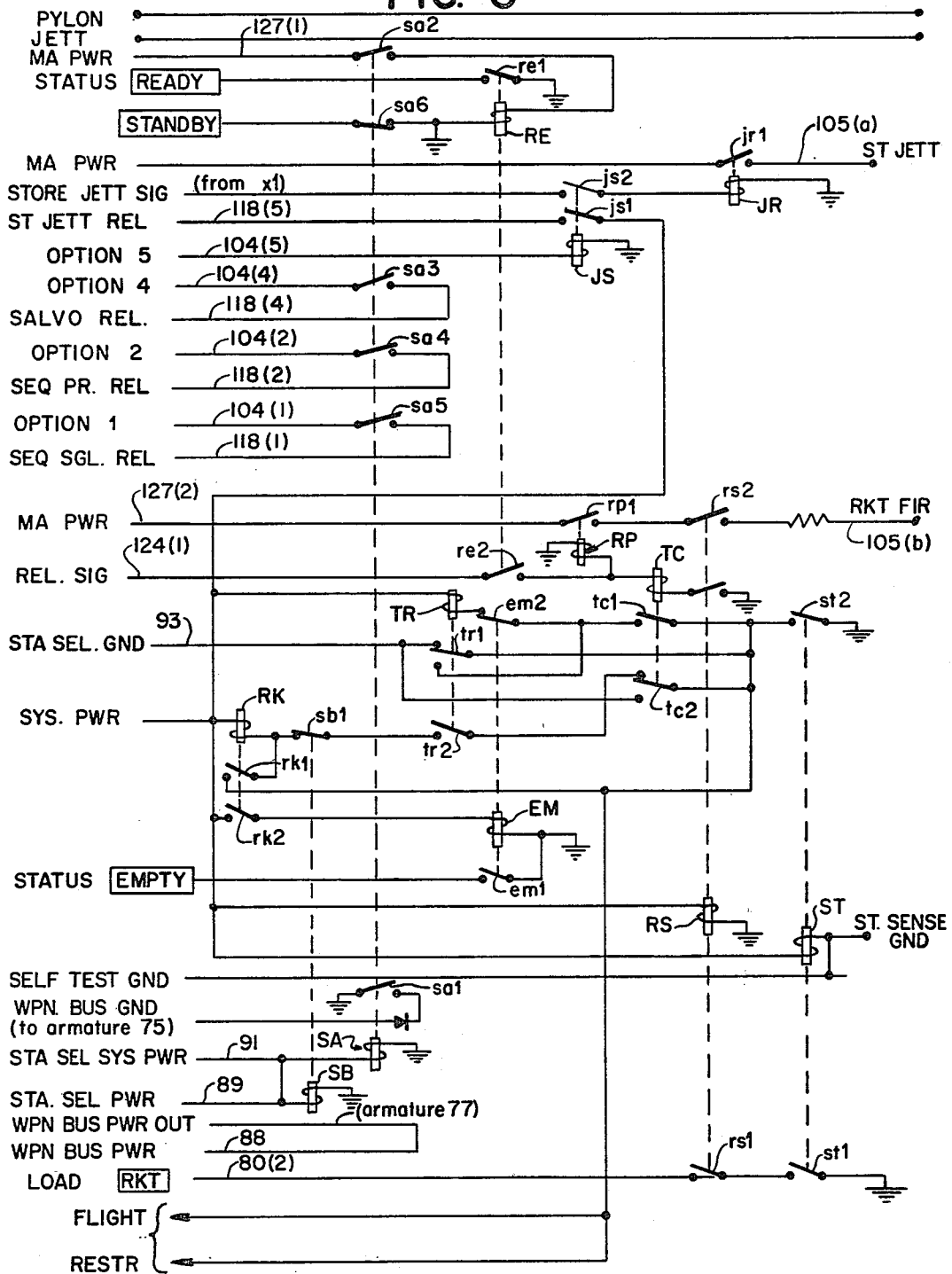
Figure 7:
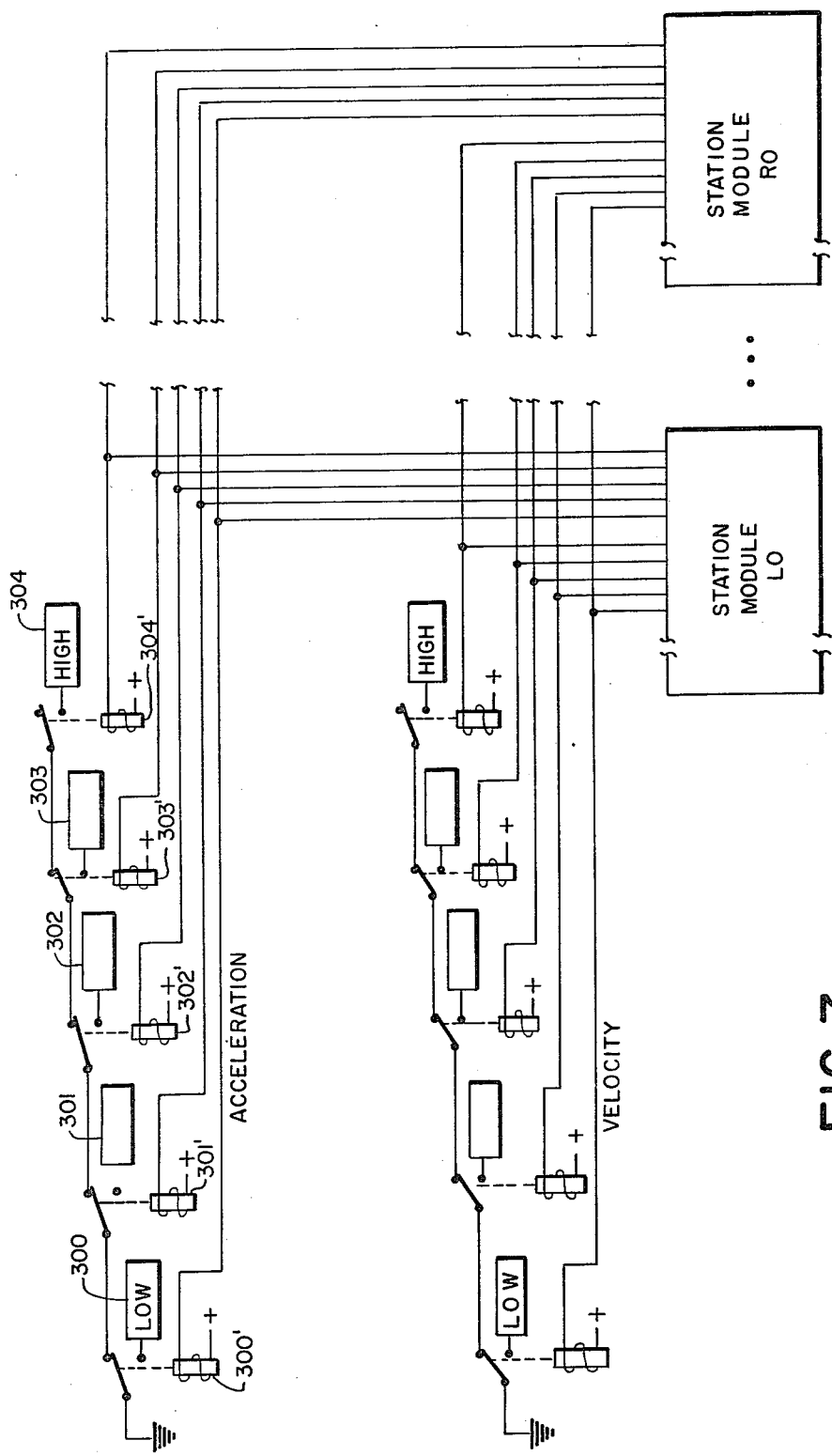

FIGURES 3A–3F comprise a schematic diagram of the display and central control assembly, according to a preferred embodiment of the invention;

FIGURE 4 is a schematic diagram of a particular feature of the invention;

FIGURE 5 is a diagram showing how FIGURES 3A–3F are put together to form a complete circuit diagram; and FIGURE 6 is a circuit diagram showing how a plugboard programs a station module for a particular operation;

FIGURE 7 is a circuit diagram showing the connection of the station modules to the display units.

In the preferred embodiment of the invention, it is contemplated that the device be employed for the control of weapons or similar stores on an aircraft, and for this reason the folowing specification is directed to a weapons control system. However, the invention is not limited to an aerial environment or to particular types of stores and would have utility with any number of actuator stations, each of which has a number of different operational modes, wherein any individual store(s) may be located at any of the respective stations.

An actuator station is defined as apparatus which is capable of releasing, firing, controlling or actuating in any other way a store which is located at that station. Such apparatus per se is well known in the art, as are the circuits required to cause operation of the apparatus. Accordingly, in the following specification the actuator stations are illustrated only in schematic form.

Referring now to FIGURES 1 and 2, the display unit is illustrated generally at 10 and a central control assembly at 12. For purposes of explanation, it is assumed that the system is to be used in conjunction with five separate actuator stations on an aircraft. These stations may conveniently be labelled as left outboard (LO), left inboard (LI), center (C), right inboard (RI), and right outboard (RO) which are located as shown in FIGURE 1. In the following specification and in the drawings, these letters are used to refer to the respective actuator stations.

As schematically shown in FIGURE 2, five separate plugboards 14a–14e are connected to the central control assembly 12. Each plugboard corresponds to one of the given stations and, by way of example, there may be a separate plugboard for each possible store to be located at the respective stations. As explained in further detail below, the effect of the plugboards is to program or alter the control circuitry of the central control assembly 12 as a function of the stores loaded at the various stations.

Referring now to the display unit 10, at the top thereof five windows 16a–16e are illustrated corresponding to the stations LO, LI, C, RI and RO, respectively. For purposes of explanation, a specific example has been selected and is described throughout most of the specification since it is believed that the principles of the invention can best be explained in this fashion. Thus, an anti-radar missile is stored at stations LO and RO and the designation "ARM MSL" appears in display windows 16a and 16e. A rocket pod is stored at stations LI and RI and the designation "RKT POD" appears in windows 16b and 16d. In this example, there is no store located at the central station C and therefore window 16c is blank. This display is set up by the control assembly 12, depending upon its programming, as schematically shown by line 17.

Five status display windows 18a–18e are provided in immediate proximity beneath the store windows 16a–16e to indicate the status of the corresponding store. Depending upon the store selected, there are many different states in which it may be (i.e., "monitor," "safe," "empty," etc.). In the present case, the loaded weapons will be considered in "standby" until selected and armed for firing (if necessary) at which time the status display will indicate that the weapon is "ready." As illustrated in FIGURE 2, the rocket pods at stations LI and RI are in standby condition, and the anti-radar missiles at the station RO and LO are in a ready condition, i.e., prepared for firing as explained below. The control assembly 12 controls the status display via control signals appearing on line 19.

There are five pushbutton actuating switches 20a–20e immediately beneath the corresponding status display windows 18a–18e. The pushbuttons 20a–20e are labelled with letters corresponding to the various stations. These buttons operate to select one (and in some cases more than one) of the stores located at the respective stations for operation. Thus, when one of the station selection buttons 20a–20e is pushed a signal is sent, as schematically illustrated by line 21, to the central control assembly 12. Depending upon the manner in which the control assembly 12 has been programmed by the corresponding plugboards 14a–14e, a return signal, schematically illustrated by line 22, causes a visual display to appear in various ones of seven mode display windows 23–29. This display indicates each of the possible modes of operation for the selected store.

The existing operational modes or various weapons or stores are well known and the same selection will be available to the user of the invention. Normally, the seven display windows 23–29 are sufficient to account for every possible mode of operating the weapon, but if this is not the case then additional display windows may be added as desired. Again, it would serve no useful purpose to consider every possible mode of operation of every possible weapon or store; thus continuing with the present example it is assumed that the station selection buttons 20a and 20e have been pushed thereby selecting the anti-radar missiles located at the stations LO and RO. As soon as button 20a is actuated the possible operational modes of an anti-radar missile are displayed in certain ones of windows 23–29. Since it is only necessary to display five operational modes, two windows (windows 24 and 26) include no display. The following modes in this particular case are available.

SEQUENCE SINGLE (window 23) one missile launched each time the firing button is actuated.

RIPPLE (window 25), the missiles are released in a ripple or train with the dwell time or release delay controlled as explained below.

AFT JETTISON (window 27), unarmed aft ejection of the missile from its launching rail when the firing button is depressed.

BAND SELECT 1 (window 28), sets the selected missile for Band 1 operation.

BAND SELECT 2 (window 29), sets the selected missiles for Band 2 operation.

The next step in the operation is to select the desired operational modes as indicated in windows 23–29, and for this purpose seven pushbutton switches 33–39 are provided immediately beneath the corresponding mode display windows. Operation of one or more of these buttons 33–39 will prepare the weapon located at the selected station for operation in accordance with that mode. In this example, it is desired to operate the missiles on Band 1; therefore button 38 is pushed. Actuation of switch 38 can, for the sake of convenience, illuminate a small arrow 28x within the window 28 to indicate that Band 1 has been selected.

The next step is to determine the method of release, and in this particular case assume it is desired to ripple the missiles located at the left and right outboard stations. Hence, button 35 is pushed causing arrow 25x to be illuminated so that the pilot knows precisely how the missile is to be operated.

After the desired mode selection buttons have been depressed, an actuating signal is sent via line 40 to the central control assembly 12 which, via line 19, causes the display in windows 18a and 18e to be changed from STANDBY to READY. The missile is now ready to be fired and when a signal is applied by a store release button 41 from a master arming switch controlled circuit to line 42, the central control assembly releases the weapon at the selected station(s), LO and RO in the present example, in accordance with the selected mode(s) of operation. After the weapons have been fired the display is removed from windows 16a, 16e and 18a, 18e so that the pilot knows there is no longer a store at the stations LO and RO.

As a further feature of the invention a flight restriction display 44 may be included. The display unit 44 is responsive to the program signals from control assembly 12 to initiate displays in windows 46 and 48 representative of the acceleration and velocity restrictions, respectively, imposed by the selected load as illustrated in the status display windows 16a–16e. Since these restrictions are known, it is a simple matter to program display 44 through the plugboards 14a–14e. Computation of the air speed and G limits may be accomplished by using the store loading information inputs as provided by the programmed control assembly 12. The outputs of a flight restriction logic section of the control assembly may then be used to activate one of $n$ circuits for $n$ increments of air speed and one of $m$ circuits for $m$ increments of G's. Obviously, the specific number of increments in either case is not material.

The system includes a memory feature by which the pilot can prepare a store for operation (or actually operate the store, for example, in the case of a radar jamming device). Thus, a status hold switch 45 is shown settable to positions STATUS HOLD and RESET. If switch 45 is thrown to the STATUS HOLD position (after option selection), the selected station remains in its "set" condition until either operated or returned to "standby" by movement of switch 45 to the RESET position.

The "status hold" capability is an important feature of the invention since it permits the pilot to select a given store, set the store for operation in accordance with a desired option, and then maintain such selected store in such set condition while operating one or more of the remaining stores. At any subsequent time when it is desired to operate the held store in accordance with the preset options, it is only necessary to return to the station selection button of that store and operate the store release switch.

Obviously, the control panel 10 (and the display 44) should be located in the cockpit where it is readily accessible and visible to the pilot. The central control assembly 12 may be located anywhere on the aircraft, and advantageously, will be outside the cockpit to conserve space. As explained below, the assembly may be broken down into a plurality of replaceable station modules all of which are centrally located. However, it would also be within the scope of the invention to distribute the individual modules at different locations throughout the aircraft.

FIGURES 3A–3F comprise a circuit diagram of a preferred embodiment of the invention. It is again emphasized that the particular stores controlled in accordance with the invention are not a material factor in this invention. Nevertheless, for purposes of explanation and clarity, a system having a predetermined capability will be described hereinbelow. To avoid redundancy, the control circuits associated with only one of the stations are shown, it being understood that the remaining circuits may be substantially identical thereto.

It should be apparent that the invention is not limited by the type of displays employed nor the specific type of programming. In particular, for ease in reading, conventional tape displays may be used, although in the construction herein described, each of the displays illustrated in FIGURE 2 includes a small commercially available projector capable of projecting at least one of eleven possible legends onto a small indicator screen. The display device includes a film matrix containing the eleven legends with a small projector lamp positioned immediately behind each of the legends. When it is desired to display a particular legend, its associated lamp is energized thereby projecting the selected legend onto the screen. If desired, the optical system can be arranged so that more than one legend can be projected onto the screen at the same time.

In FIGURES 3A–3F the individual display units required for a single station, the left outboard station LO, are schematically illustrated so as to show each of the possible displays. The meaning of each legend in the various displays will be clear to those skilled in the weapons and armament arts. Moreover, a complete understanding of the various terms is not necessary for a full appreciation of the invention, it being sufficient to know that the terms represent certain known stores capable of being controlled in accordance with one or more known modes of operation. Those skilled in the weapons art will be familiar with the particular stores herein discussed, and the meaning of the various displays, including the operational modes and status, should be apparent. It is possible that even in the case of these conventional weapons certain display modifications for particular purposes may be preferred.

In the following specification there are a number of information channels which consist of a plurality of parallel lines. In the interests of simplicity, each of such information channels will be identified by a two or three-digit number with the individual lines in that channel identified by the same two or three-digit number with a distinguishing number in parenthesies thereafter. For example, channel 102 consists of lines 102(1) through lines 102(7).

The control circuits of the central control assembly employ relays which are designated by capital letters with the corresponding contacts indicated by the lower case letter followed by a numeral. All of the relays are shown in their de-energized state to avoid misunderstanding although the explanation of the selected example is carried through FIGURES 3A–3F.

As a practical matter it may be desirable to break up the central control assembly 12 into a number of identical station modules, one for each of the program plugboards, which cooperate with a common portion of the assembly. This is desirable since a major portion of the control assembly corresponding to any given station (assuming such stations are to have the same capabilities) will require identical circuits, and maintenance, replacement, and troubleshooting will be considerably simplified if the modules themselves may be removed. Accordingly, and by way of example, the station LO is shown to consist of a station module 12a which includes sixteen relays and their associated contacts. These relays are designated as K-1 to K-16 and perform the logical functions of the control assembly for a given station depending upon their programming by the plugboard. With sixteen relays any logical manipulation required to operate all known and predicted stores is possible. The programming is accomplished in the plugboard by routing the power signals and/or the information signals to energize the suitable relays K-1 to K-16, and at the same time routing the output signals from the relay contacts to the output weapon trunk lines so that the desired operation occurs. The common portion of the central control assembly is not specifically isolated in the diagram.

The program plugboards may be constructed in accordance with various well-known techniques. For example, after the required logic has been determined, a relay circuit may then be designed to accomplish the required functions. Since the relays will already be present in the station module, it is then a simple matter to design a plugboard circuit to provide the required operation. A specific example of a plugboard corresponding to a rocket store, and the associated portion of a station module are described with reference to FIGURE 6.

Figure 3A:
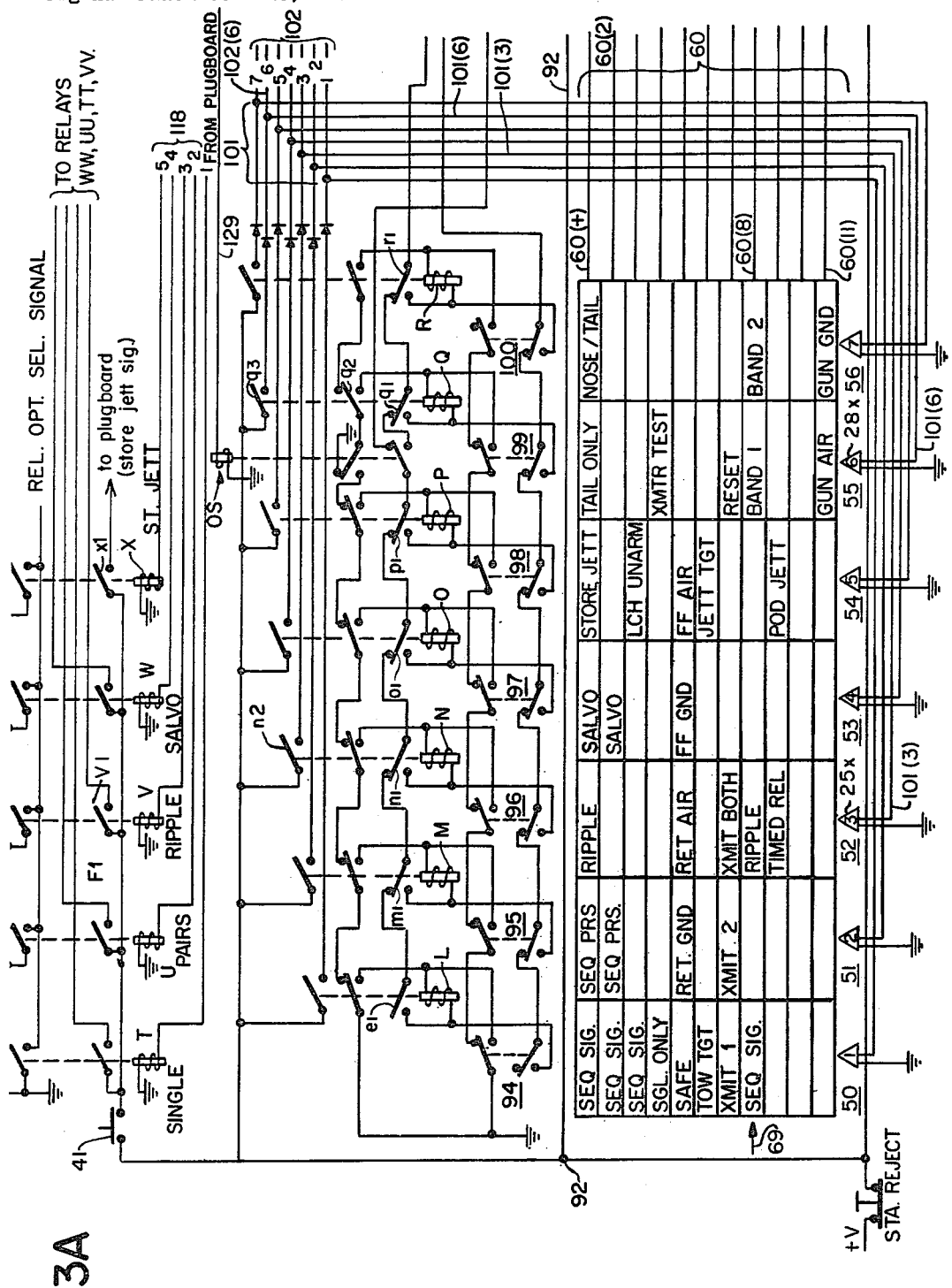

The displays for the operational modes are shown in FIGURE 3A as consisting of seven individual projector units 50–56. As explained above, each of these projector units can display one of eleven vertically arrayed legends indicated in FIGURE 3A, with a horizontal line of legends being energized at one time.

To the right of the display, eleven conductors 60 are illustrated which are used to energize the horizontal lines of displays, depending upon which of the conductors is energized by a ground signal. Each of conductors 60 is connected to one of the eleven leads of each display projector 50–56 so that energization thereof will produce the required display. In the present example, line 60(8)

will be energized setting up the display in the line to which arrow 69 points and which is illustrated in FIGURE 1.

Figure 3D:
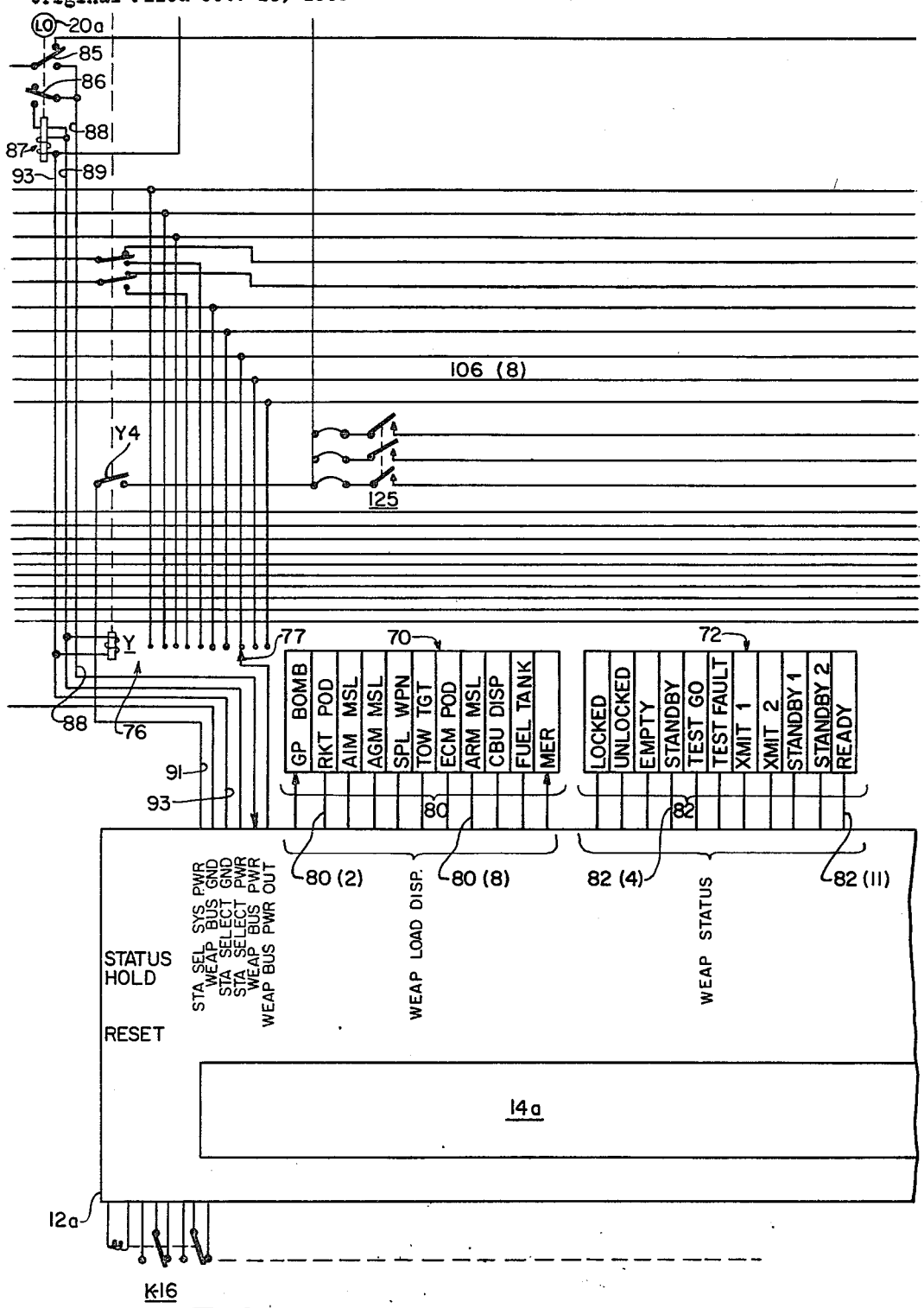

The store and status displays are shown at 70 and 72, respectively, in FIGURE 3D. These displays 70 and 72 are connected directly from station module 12a into which the plugboard 14a is inserted and will display one of the illustrated legends depending upon which of the input lines is energized. It is again noted that the present discussion relates only to the left outboard station LO and that each station includes counterparts of the displays 70 and 72, the station module 12a and, of course, the plugboard 14a.

A pair of rotary switches 74 and 76 (FIGS. 3B and 3D) having respective armatures 75 and 77, are also connected to the station module 12a. The armatures 75 and 77 are set at the time the various weapons are inserted at the respective stations. The switches may be located immediately adjacent the plugboards themselves and the suitable armature position for the switches indicated on the back of the plugboard. The switches are not necessary and the function which they serve can be accomplished by the plugboard alone if it is so desired. In the present example the armatures 75 and 77 have been set to the eighth stationary contact.

When the power switch (not shown) has been turned on after the weapon has been properly loaded and the suitable plugboards inserted, the displays 70 and 72 are immediately energized. In the instant case, line 80(8) will produce the display "ARM MSL" shown in window 16a indicating that an anti-radar missile is located at the left outboard station LO. Initially, line 82(4) will energize the display "STANDBY" to show that the weapon is in a standby condition.

When the station selection button 20a (FIG. 3D) is pushed, contacts 85 and 86 are closed, energizing the coil 87 of holding solenoid from a bus 92 through relay contact $k3$, and applying the voltage on bus 92 to a weapon power bus 88. Power bus 88 is also connected through closed switch 86 to a station select power line 89 which causes energization of station select relay Y. Line 89 is connected back to the station module 12a which, through the plugboard conncetions, may serve various enabling functions. Contact $y4$ applies voltage to a station select system power line 91 which remains high as long as solenoid coil 87 is energized.

Since switch armature 75 is grounded, a circuit is completed to an anti-radar missile relay H (FIG. 3B) through the armatures 75 and 77 on which appears a voltage routed through the plugboard 14a from power bus 88. Energization of relay H closes contacts $h1$ and $h2$, the former applying a ground potential to line 60(8) actuating the required display indicated by arrow 69 (FIG. 3A). Closure of contact $h2$ permits application of the positive potential on bus 92 across relay K (FIG. 3B) which also provides enabling signals, as discussed below, after station selection has been made. Contact $h3$ completes a holding circuit for relay H to bus 92. Plugboard 14a connects the power on line 91 to line 89 to provide the solenoid holding power when contact $k3$ opens.

Operation of each of relays A–G, I and J is essentially the same as that described above with relay K being energized each time. Of course for each relay A–J energized, a different display is set up in the operational mode display by grounding respective lines 60(1)–60(11).

Line 60(11) is normally grounded through relay contach $k2$ which means that prior to a station selection operation the mode displays "GUN AIR" and "GUN GND" are energized. This provides the capability of firing the aircraft guns in either an air-to-air or air-to-ground mode. Such guns are apart from the stores of the weapons control system described herein for explanatory purposes.

In the present example, the station selection button 20e at station RO will also be actuated so that station module 12e will be in the same condition described above, and will behave in the same way except where otherwise indicated.

Seven mode relays L–R are responsive to the energization of the mode selection buttons illustrated in FIGURE 1 as 33–39 (FIG. 3A). The mode selection buttons may comprise a pair of ganged single pole, double throw switches 94–100. Thus, when switch 99 is pushed, relay Q is connected from ground through the upper contacts of switches 94–98, the lower non-actuated switch contacts of switch 100, the normally closed contact $s1$ of relay S, and the new closed contact $k1$ to the positive voltage on line 92.

Closure of contact $q2$ grounds one side of the relay Q with $q1$ connecting the other side to power (through contact $k4$) as a holding network so that when pressure is removed from the push-button switch 99 relay Q remains energized. Closure of relay contact $q3$ applies the positive potential on line 92 through line 101(6) and closed contact $q3$ to a small indicator arrow 28x to indicate that the sixth option has been selected.

The positive potential on line 92 is also coupled to line 102(6) tied to a line 104(6) (FIGS. 3E and 3F) which is coupled to the input of the station module 12a. The program plugboard 14a may route the return signal on line 104(6) to one of the output trunk lines 105 or it may operate on the signal in a known fashion to energize a plurality of output lines 105. In this particular case, since there are a number of possible operations caused by actuation of switch 99 some logical manipulation will be required. Hence, the plugboard 14a causes the appropriate line(s) 105 to be energized in response to the selection of the sixth optional line 102(6) which will operate the anti-radar missile at station LO on band 1.

It is recalled that the next step is to select the firing mode which, in the example, is "ripple" manifested by the third option. Hence, the push-button 96 is actuated to energize relay N in substantially the same manner described above with respect to relay Q. In this case the indicator arrow 25x is energized by line 101(3) through closure of contact $n2$, while lines 102(3) and 104(3) return the necessary control signal to the station module 12a and plugboard 14a. By virtue of a simple manipulation within the plugboard, the suitable weapon trunk lines 105 are enabled to permit release of the selected anti-radar missiles in a ripple mode upon actuation of the store release switch 41 (FIG. 3A), as explained below.

When the ripple option has been selected, the plugboard and station module also place an energizing signal on line 118(3) (FIGS. 3F and 3E) which energizes a ripple relay V (FIG. 3A). Closure of contact $v1$ enables a second ripple relay VV which, when energized by closure of the store release switch 41 applies a positive potential across a timer 120 through $vv1$. Timer 120 feeds firing pulses at preset intervals which may be varied by a control knob 122 from a position exterior of the control panel. The timer output is connected through a closed relay contact $y1$ (FIG. 3C) to a store release line 124(1) (FIGS. 3E and 3F) which is coupled back to the station module 12a and plugboard 14a where it is routed to the necessary trunk lines 105 to permit firing the missile at the selected ripple frequency.

Figure 3F:
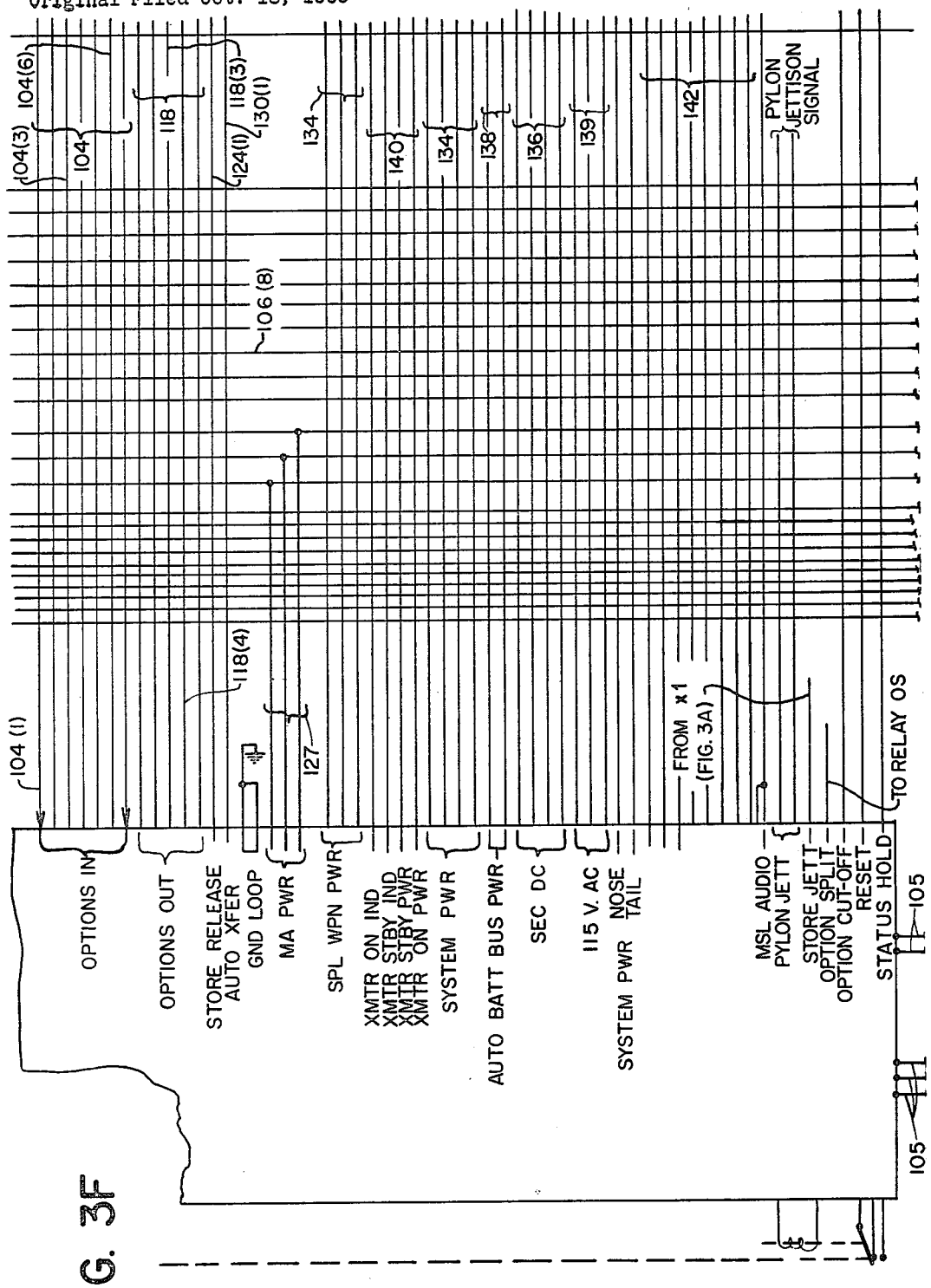

The actual release of the store is accomplished by first operating a master armament switch 125 (FIG. 3D) which is conventional and serves as a safety switch to apply master armament power to lines 127 (FIG 3F). Thus, when the store release button 41 (FIG. 3A) is depressed, a voltage is applied from bus 92 through contact $v1$ to relay VV. Energization of relay VV applies timing signals through contact $vv1$ and timer 120 to a store release line 124(1) which is returned through closer contact $y1$ to the plugboard (FIGS. 3E and 3F). The presence of a signal on line 124(1) gates the master armament power to the appropriate lines 105 to cause the anti-radar missile at the station LO to be fired in a known fashion.

When the missile at station LO has been fired, the programmed module 12a breaks the holding circuit to the solenoid 87 (FIG. 3D) by opening the station select ground line 93 and thereby releasing relay Y. The next ripple release signal from timer 120 is then coupled from line 124(1) to line 124(2) through contact y1 and so forth at each station, until it reaches line 124(5) which will be returned to the plugboard through the operated y1 contact of the selected RO station. Hence, the next release signal will fire the missiles at that station. The principles of this operation are described in detail below with reference to FIGURE 5.

The switches 94–98 may include interlocking circuits to prevent the selection of two incompatible modes and to permit selection of only the last selected option. For example, when switch 96 is actuated the opening of its lower illustrated contacts would immediately release relays L, M, O or P permitting energization of relay N alone. Switches 99 and 100 are similarly interlocked, and may be interlocked with switches 94–98 by a signal on line 129 from the plugboard which would energize an option splitting relay OS, when, unlike the present example, it would be desirable to prevent selection of two options.

The foregoing description should be sufficient to fully understand the operation of the illustrated circuit. Energization of any one of the relays A to J by closure of the respective station selection switches 20a–20e will cause one of line 60(1) to 60(11) to be grounded thereby visually displaying the possible mode options for the selected store. Subsequent selection of any or more of the desired options by actuation of the mode switches 94–100 will send a signal back to the proper plugboard through channels 102 and 104. By means of a conventional logical manipulation within the plugboard 14a one or more of the weapon trunk lines 105 will be enable so that operation of the store release switch 41 will release or fire the selected store in accordance with the selected option(s).

The relays T, U, V, W, and X operate to control the store release in accordance with the indicated modes on the drawing. These relays (except for relay X) enable their correspondingly numbered output relays TT–WW to return a store release signal through the closed contacts of the Y station selection relay associated with the selected station.

For example, energization of the salvo relay WW will fire all of the selected weapons at one time. Hence, it is necessary that the output contacts of relay WW be returned to each selected station and programmed through the corresponding plugboards to the necessary weapon trunk lines 100. If station selection button 20a is pushed, contact y1 will energize line 124(1) when relay WW is energized. At the same time lines 124(2) through 124(5) will return signals to their associated plugboards at the remaining stations so that the weapons at those stations may be also fired if the corresponding station selection buttons are pressed.

The contacts of the "pairs" relay UU operate to apply ground to channel 130 which consists of five lines coupled to the respective plugboards. The purpose of relay UU is to operate the selected stores two at a time, and, for example, if station selection button 20a is depressed, ground will be applied to line 130(1) through closed relay contact y2.

Energization of the "single" relay TT applies a voltage to line 124(1) if relay Y has been operated at the station LO. Otherwise the signal is applied through normally open relay contacts y1 and y2, lines 124(2) and 130(2) to the subsequent stations. A ground signal will appear on lines 130(1) through 130(4), and a plus voltage on line 130(5) when relay UU is energized. However, the positive voltage is also applied to lines 124(1) and 124(2) which are returned to the stations LO and LI, respectively.

It is not material to an understanding of the invention to fully appreciate the manner in which power is applied to the various stations. The following explanation is therefore given in general terms with respect to the power supplies normally available on conventional fighter aircraft. Thus, a twenty-eight volt DC primary source of power appears on bus 134, a secondary source of DC power on bus 136, and a battery source of DC power on bus 138. The function of the secondary, primary and battery source (which serves as an emergency source of power) will be well known to those skilled in the art. Also, a three-phase source of alternating current at four hundred c.p.s. may appear on line 139. Additionally, control signals for the various transmitters appear on line 140 which will operate the transmitter as indicated on the drawing. A channel 142 is also coupled to the control module 12a and into the plugboard 14a to provide the capability of releasing or firing special weapons which may require circuits totally apart from those previously described.

FIGURE 4 illustrates a portion of the station module programmed for a status hold operation. The following description refers also to FIGURES 3A–3F as indicated, and, though simplified, explains how the plugboard and station module can provide this important feature.

For purposes of this example, it is assumed that relay K–3 corresponding to one of those illustrated in FIGURES 3D and 3F has been energized by a signal on line 200 which is returned from the control panel thereby enabling certain ones of the weapon trunk lines 105 illustrated in FIGURE 3C, although not shown in FIGURE 4. Two relays SH and RE correspond to two other relays K–1 to K–16.

The status hold switch comprises an armature 202 (see also FIG. 3E) connected to the system power and manually operable to either of terminals 204 or 206. Closure of armature 202 and terminal 204 will energize status hold relay SH through a relay contact 208 (the coil of which is not shown), which is closed when that particular station has been selected, and a normally closed reset relay contact re1. When armature 202 is moved to position 206, the reset relay RE is energized through relay contact 209 serving the same function as contact 208.

In the present example it is assumed that energization of relay K–3 will, through the illustrated but unnumbered relay contacts thereabove, cause a particular control option to occur. In addition contact k31 is connected by the plugboard to the relay coil K–3 to operate as a holding circuit.

In operation, assume that there has been a selection of the option controlled by relay K–3 and, accordingly, an energizing signal appears on line 200. If the user does not wish to immediately operate in accordance with that option, the armature 202 of the status hold switch is thrown to position 204 energizing the status hold relay SH (contacts 208 and 210 will be closed upon selection of the illustrated station). Energization of status hold relay SH completes a holding circuit to the system power through both contacts sh1 and sh2 and the holding contact k–31. Consequently, after the status hold switch has been operated, another station may be selected while maintaining the relay K–3 in an energized state through contacts k–31 and sh2. Moreover, a signal is applied to an option cut-off line 211 which is returned to relay S (FIG. 3B) opening contact 51 and preventing further option selection until such other station is selected (thereby opening contact 210 and releasing relay S).

When the user subsequently returns to the station which is in a "status hold" condition, all of the required output signals from the corresponding program plugboard will be present, and the presence of a signal on one or more of lines 104 (FIG. 3e) will ignite one or more of the corresponding indicator lights 50–56, showing which of the options had been previously selected for that station.

To remove the station from the status hold condition armature 202 is thrown to the reset terminal 206 energizing relay RE to open contact re1 and remove the energizing potential from the status hold relay SH. Accordingly, the station returns to its original condition.

As explained above, the status hold feature of the invention is a holding circuit which is energized when the status hold switch is actuated. A full equivalent of the status hold feature would be to automatically operate holding circuits in response to a selection of an option, and maintain the station in that condition unless it is specifically desired to release it by operation of a reject switch or the like.

The invention contemplates numerous mode displays. Thus, selection of a given station may initially set up a display only of the delivery modes available for the store located at that station. After selection of a displayed delivery mode, all of the various control or release options available for the selected store (in accordance with the selected delivery mode) may be displayed. When the control option is selected a further display of the possible firing and fuzing options for the particular store may be provided.

For example, if a general purpose bomb were the selected store, the various possible delivery modes (dive, radar, level, manual, etc.) would automatically be displayed. After selection of a delivery mode, the control options (sequence single, ripple, etc.) would be displayed and the desired selection would be made. If, for example, the pilot selected the ripple option, he would push the appropriate "ripple" button and then turn a rotary switch from the "control" position to a "ripple rate" position causing the displayed control options to be replaced by a plurality of ripple rate options. The pilot then would select his desired ripple frequency with the status window indicating whether or not further option selection is necessary. Hence, if the status window still read "safe" a further option would be required in which case the rotary switch would be turned from the "ripple rate" position to a "mechanical arm" position causing the ripple rate display to be replaced by the available mechanical arming options for the selected general purpose bomb. In this case, such options may comprise "nose," "tail," and "nose and tail."

The pilot would then depress the desired "mechanical arm" option button causing the status display to change from "safe" to "armed." When the master armament switch is actuated the status display will change from "armed" to "ready," and the weapon can then be released in accordance with all of the selected delivery and control modes by actuating the store release switch.

It is contemplated that the circuit will include various self-testing features located at the central control assembly, the control panel or both. For example, each station module may include a GO/NO GO self test button which will register and monitor critical points in the control system to test the circuits peculiar to the weapon type selected. The program base of the central control assembly may periodically be tested by insertion of a self-test program card in the respective station modules in a conventional manner. A fault isolation switch may be used in conjunction with the self-test network to isolate a circuit fault in the system. Should a NO-GO signal be encountered during the preflight self-test, the fault can be isolated to one of three major sections of the system. For example, such isolation may be accomplished by holding down the applicable station self-test button and notating a fault isolation switch through the input, central control assembly, and station module position, with a NO-GO light indicating when the faulty section of the system has been isolated.

It has previously been emphasized that the present invention is not limited to specific types of stores or weapons, nor to particular actuator stations. It is therefore apparent that the particular manner in which the plugboard causes the control assembly to route the various input signals to the output lines will vary greatly depending upon particular uses of the invention. Nevertheless, and solely by way of example, reference is now made to FIG. 6 which is a circuit diagram of a station module containing the various relays K-1 through K-16, and showing how the plugboard would program such relays and their associated contacts. As in the case of FIGS. 3A-3F, the circuit diagram is not complete in all respects; however, the description is sufficient to give one skilled in the art a full and complete understanding of the principles of this aspect of the invention.

In FIG. 6, for purposes of simplification, no effect has been made to differentiate the station module components from the wiring of the plugboard. Those skilled in the art will recognize that the wiring represents the plugboard with the relays of the circuit corresponding to the station module. The ground symbols indicated in the circuit diagram are also provided by the plugboard. Further in the interests of clarity, the relays previously identified as K-1 to K-16 in FIGS. 3D and 3F are now labelled specifically with reference to the example to be described.

The example selected to explain the operation of the station module and plugboard of FIG. 5 pertains to the firing of a rocket rather than the anti-radar missile used previously. The rocket example is selected because the circuits involved initiate less functions and therefore are less complex than the anti-radar missile circuits, and also because it provides to a limited extent an opportunity to illustrate the wide variety of functions which the invention is capable of controlling. Wherever possible, lines corresponding to FIGS. 3A-3F have been identically numbered in FIG. 6.

The actual apparatus used to release or fire the stores is not illustrated. Such apparatus may be conventional, and, for example, of the type used in the F-105 fighter aircraft manufactured by the assignee of the present invention.

When the plugboard is inserted into the station module (and the power switch turned on), the system power is applied to a rocket select relay RS which is grounded by the plugboard. Simultaneously, a store sensing relay ST is energized so that a ground signal is applied through the closed contacts rs1 and st1 of the two above-named relays to a "rocket" indicator display unit via output line 80(2). Simultaneously a "standby" status indication may be given.

After the illustrated station has been selected, a voltage appears on the station select system power line 91 which causes energization of two station selection relays SA and SB. Contact sa1 applies a ground signal to the switch armature 75 (of FIG. 3B) which in this case will be placed to the second position so that relay B is energized by application of the weapon bus power through the plugboard and armature 77. Station select system power line 91 is also coupled directly to the station select power line 89.

In the present example, the rockets are already armed for firing, and the only required status indications are "ready" and "empty." Thus, insertion of the plugboard will apply a ground signal to a ready relay RE which, in turn, will apply a ground through its contact re1 and line 82(11) to the ready indicator of display 72. This indication does not appear until the relay SA is energized by a station selection so that the voltage on the master armament power line can be applied to the relay RE through contact sa2. The "standby" indication is removed by opening sa6.

Contacts sa3, sa4, and sa5 close to couple the appropriate option lines 104 to channel 118 to permit energization of the suitable relays T, U, V, W or X (FIG. 3A). In the present case, only the first, second, fourth and fifth options are available (corresponding to sequence single, sequence pairs, salvo and store jettison) so that the respective relays T, U, W and X will be energized when the corresponding option selection button 94, 95, 97 or 98 has been depressed. In the case of the store jettison option, the energizing signal for relay X is derived from the contact js1 (FIG. 6) of a jettison select relay JS which is energized in response to an "option 5" selection. Closure of contact js2 permits a jettison release power relay JR to be energized when a store jettison signal is applied thereto. This store jettison signal is derived directly from the store release switch 41 through contact x1 (FIG. 3A) when the fifth option has been selected. When the jettison release power relay JR is energized, the master armament power is coupld to th store jettison output line 105(a) through relay contact jr1 to jettison the rocket in a known fashion.

The contact re2 permits energization of a heavy duty release power relay RP and a transfer control relay TC when a signal is applied to the release signal line by depressing the store release of switch 41. After the release power relay RP is energized (through contacts tt2 and y1), the master armament power bus energizes a rocket firing line 105b through the release power relay contact rp1 and the rocket selection relay contact rs1. Line 105b corresponds to one of the module output lines 105 of FIGURE 3F.

In the embodiment described in FIG. 6 one of the operational modes is "sequence single" (option 1) which means that each time the store release button is depressed, the rockets at one of the selected stations are fired. When the rockets have been fired from that station, the circuit auomatically transfers to one of the other selected stations so that when the release switch is operated again, the rockets at the next station are fired.

Assume that the circuit illustrated in FIGURE 6 pertains to the station which is to be fired first. When the release signal has been applied to the release power and transfer control relays RP and TC causing energization of the rocket firing line 105(b) from the master armament power, the transfer control relay contact tc1 energizes a rocket station transfer relay TR through the closed contact st1 of a store sense relay ST. The store sense relay, in the case of a rocket, only senses the presence of the rocket pod and remains energized after th rocket(s) is fired.

The rocket station transfer relay TR includes a holding contact tr1, and when the release signal is removed, relay TR remains energized.

As long as the release signal is present, the station select ground line 93 is grounded through contact tc2 even though tr1 is open. However, when the store release button is released, relay TC is de-energized and the ground is removed from line 93 thus releasing holding solenoid coil 87 (FIG. 3D), causing the station selection switch 20a to return to its illustrated position, and relay Y to be de-energized. When this occurs, both station selection relays SA and SB are de-energized. When the latter is de-energized, a rocket relay RK is energized through contacts tr2 and tc2 closing a holding circuit through rk1 to maintain the relay RK energized and at the same time energizing an empty relay EM through rk2 to provide an empty status indication in the cockpit through contact em1. Release of the station selection relay SA opens the circuit to the ready relay RE through sa2 so that the ready indication in the status display is extinguished. Opening of contact em2 releases the rocket station transfer relay TR. However, the rocket relay RK remains held by its own contact rk1.

The next time operation of the release switch applies a signal to the release line, the signal is shunted to the next successive station so that the rockets at that staion may be fired if the station selection button has been depressed. The operaion of that circuit would be identical to that described above. The transfer to the next successive station is controlled in part by the portion of the transfer circuit illustrated in FIGS. 3A and 3D, which appropriately shunts the information to the remaining stations and their associated portions of the central control assembly, as well as the respective station modules and plugboards. For example, if the next selected station were LI, the release signal would be applied to the plugboard at that station through the illustrated y3 contact (FIG. 3C), line 124(2), and the y3 contact (not illustrated) of station LI.

A preferred embodiment of the circuit used to provide the flight restriction display 44 (FIG. 2) is illustrated in FIG. 7. As previously mentioned, the flight restriction display is programmed through the individual station modules and therefore will be a function of the loaded stores.

In FIG. 7, five separate display units 300-304 are illustrated, although obviously any other number may be employed. The five units 300-304 may correspond to five separate legends of a single projector type display unit (or its equivalent) as described above. In the following description only the acceleration display is specifically described since the velocity display functions in the identical manner.

The display 300, when energized by application of a ground signal thereto, will display the lowest of five incremental acceleration limits. Display 304 will display the highest of the possible acceleration limits, with displays 301-303 displaying respective incremental steps between these two extremes. A relay coil 301'-304' is associated with each of the displays, and each relay, when energized, will close its contacts to apply a ground signal to its associated display unit to display that legend, provided none of the preceding (i.e., "lower") relays are energized.

Referring to FIG. 6, it is recalled that the flight restriction displays are coupled through the station module and plugboard in such a fashion that they are grounded through contact st1 when a store sense relay ST is energized. In the case of the rocket store therein described, the store sense relay is always energized and the flight restriction display does not change when the rockets are fired. However, in case of a general purpose bomb and various other stores, when the store is released the store sense relay ST is de-energized by opening a circuit which is grounded through the store itself, causing contact st1 to open and removing the ground from the flight restriction display units.

In FIG. 7 each station module applied the ground signal from st1 to one of the five relays associated with displays 300-304. However, because of the series connection of the respective contacts of the five relays, only the display corresponding to the lowest restriction is energized. For instance, if the store loaded at station LO requires a flight restriction such that the applicable legend of display 301 is required, the programmed station module at station LO will energize relay 301' so that the legend of display 301 will be displayed regardless of whether relays 302', 303' and 304' are energized. However, when the store at station LO is released, if it is of the type which subsequently removes the ground from the store sense relay ST in the station module, then the de-energization of relay ST will remove the ground signal from relay 301' by opening contact st1, and the restrictions imposed by this store will no longer be displayed (unless one of the other remaining stations hold relay 301' energized). When the contact of relay 301' returns to the illustrated condition, the next lowest applicable restriction will be displayed.

There are obviously numerous ways in which the flight restrictions may be displayed. This feature of the invention contemplates the use of any type of logic for automatically displaying all changeable flight restrictions as a function of the loaded stores.

Although a preferred embodiment of the invention has been illustrated and described, the invention is not so limited and many modifications thereof will be obvious to those skilled in the art. In particular, the number of stations and the types of stores located at such stations is immaterial to the invention. Obviously, the requirements will vary tremendously depending upon the aircraft into which the system is loaded and it is contemplated that the plugboards of the invention be programmed to control various stores in accordance with conventional practice.

The type of logic employed, i.e., solid state, relay, etc., is also immaterial to the invention. Moreover, the invention is not restricted to any particular type of programming. Although standard plugboards comprise a particularly desirable way of programming a system of this nature, any other programming equivalent could be used. For example, rotary switches could readily be arranged by those skilled in the art to provide all of the necessary programming functions to suit a particular purpose. To reduce the number of connectors between the plugboard and the control or display panel, various standard forms of transmission may be used. In particular, binary coded information may be serially transmitted by a single line and subsequently decoded at the control panel itself to energize the required displays.

I claim:

1. A device for controlling a plurality of separate actuator stations, each of said stations being adapted to actuate a replaceable store in at least one of a plurality of possible modes, comprising programmed control means, first display means coupled to said control means for identifying the store to be actuated at each of said stations, and second display means coupled to said programmed control means for displaying said plurality of possible modes, the displays of said first and second display means being determined by the programming of said control means.

2. A device for controlling a plurality of separate actuator stations, each of said stations being adapted to actuate a replaceable store in at least one of a plurality of operational modes, comprising programmed control means, first display means operatively coupled to said control means for identifying the apparatus to be actuated at each of said stations, second display means for displaying the operational modes of a preselected station, said second display means being responsive to said programmed control means, and means responsive to the selection of at least one of the displayed operational modes for enabling said control means to actuate said preselected station in accordance with said one displayed mode.

3. A device according to claim 2, including means for indicating the status of the apparatus stored at each of said stations.

4. A device according to claim 3, including station selection means for enabling at least one of said stations, said second display means being operative in response to said station selection means.

5. A device according to claim 4, including means responsive to operation of said mode selection means for altering the status display of said selected station.

6. A device for use in controlling the operation of a plurality of stations, each of said stations adapted to actuate an associated store in accordance with at least one of a plurality of operational modes, comprising control means for controlling the operation of said stations, means for programming said control means depending upon the respective stores located at said stations, means for displaying the identity of each of said stores depending upon the programming of said control means, a station selection switch associated with each of said stations, means connected from said control means and responsive to the operation of a selected station selection switch for displaying the available operational modes of the store associated with said selected station selection means, and mode selection means for enabling said control means to operate said selected station in accordance with at least one of said available modes.

7. A device for use in controlling the operation of a plurality of stations, each of said stations adapted to actuate an associated store in accordance with at least one of a plurality of operational modes, comprising control means for controlling the operation of said stations, means for programming said control means depending upon the respective stores located at said stations, means for displaying the identity and status of each of said stores depending upon the programming of said control means, station selection means associated with each of said stations, and display means responsive to said control means for displaying the available operational modes of the store associated with a preselected station, said last named display means being controlled by said programming means.

8. A device according to claim 7, including mode selection means for enabling said control means to actuate the store located at each said preselected station in accordance with at least one of said available modes.

9. A device for controlling a plurality of actuator stations, each of said stations being adapted to actuate a replaceable store in at least one of a plurality of operational modes, comprising first display means for identifying the store to be actuated at each station, second display means for indicating the operational status of the stores, control means for controlling the actuation of each of said stations and for determining the displays produced by said first and second display means, station selecting means connected to said control means for selecting at least one of said stations for actuation by said control means, third display means connected to said control means for displaying at least some of the operational modes of the store located at said one selected station, said control means including means for determining the display produced by said third display means, mode selection means for permitting said control means to control the actuation of said one station in accordance with at least one of said operational modes displayed by said third display means, and means for altering the functioning of said control means depending upon the store located at said stations.

10. A device according to claim 9 wherein said station selecting means includes means for operating said third display means when at least one of said stations is selected for actuation by said control means.

11. A device according to claim 9, including means responsive to said station selecting means and said mode selection means for holding a selected station or stations in an operational status corresponding to the selected mode or modes of operation despite subsequent selection of another station for actuation.

12. A device according to claim 11, including reset means for returning a station held by said holding means to its initial condition.

13. A device for controlling N actuator stations, each of said stations being adapted to actuate a replaceable store in at least one of a plurality of operational modes, comprising N first display means for identifying the store to be actuated at each station, N second display means for indicating the operational status of the stores, control circuit means for controlling the actuation of each of said stations and for determining the displays produced by said first and second display means, station selecting switch means connected to said control means for selecting at least one of said stations for actuation by said control means, M third display means connected to said control circuit means for displaying at least some of the operational modes of the store located at said one selected station, said control means including means for determining the displays produced by said third display means, M mode selection switch means associated with respective third display means for permitting said control circuit means to control the actuation of said one station in accordance with at least one of said operational modes displayed by said third display means, and N plugboard means for altering said control circuit means depending upon the stores located at said stations.

14. A device according to claim 13 wherein each of said third display means comprises means for displaying at least one of a plurality of preselected legends corresponding to more than one store, and a plurality of input lines associated with the respective legends, energization of a given input line causing the visual display of its associated legend, said control circuit means including means for energizing at least one input line of one or more of said third display means.

15. A device for controlling a plurality of actuator stations, each of said stations being adapted to actuate a replaceable store in at least one of a plurality of operational modes, comprising first display means for identifying the store to be actuated at each station, second display means for indicating the operational status of the stores, control means for controlling the actuation of each of said stations and for determining the displays produced by said first and second display means, station selecting means connected to said control means for selecting at least one of said stations for actuation by said control means, mode selection means for permitting said control means to control the actuation of said one station in accordance with at least one of said operational modes, and means for altering the functioning of said control means depending upon the store located at said stations.

16. A device for controlling a plurality of actuator stations, each of said stations being adapted to actuate a replaceable store in at least one of a plurality of operational modes, comprising first display means for identifying the store to be actuated at each station, second display means for indicating the operational status of the stores, control means determining the displays produced by said first and second display means, station selecting means connected to said control means for selecting at least one of said stations for actuation, third display means connected to said control means for displaying at least some of the operational modes of the store located at said one selected station, said control means including means for determining the display of said third display means, and means for altering the functioning of said control means depending upon the store located at said station.

17. Weapon control apparatus for controlling a plurality of weapon actuator stations on an aircraft having a cockpit, each of said stations being adapted to actuate a replaceable weapon in at least one of a plurality of operational modes, comprising first display means in said cockpit for identifying the weapon to be actuated at each station, second display means in said cockpit for indicating the operational status of the weapons, control means for controlling the actuation of each of said stations and for determining the displays produced by said first and second display means, station selecting means in said cockpit connected to said control means for selecting at least one of said stations for actuation by said control means, third display means in said cockpit connected to said control means for displaying at least some of the operational modes of the weapon located at said one selected station, said control means including means for determining the display produced by said third display means, mode selection means in said cockpit for permitting said control means to control the actuation of said one station in accordance with at least one of said operational modes displayed by said third display means, and means for altering the functioning of said control means depending upon the weapons located at said stations.

18. Apparatus according to claim 17, wherein said control means and means for altering are situated outside of said cockpit.

19. Apparatus according to claim 17, further including a control panel in said cockpit, said first, second and third display means being positioning on said panel, said station selecting means and said mode selection means each including switch means for actuation thereof, and also located on said control panel.

20. Apparatus according to claim 19, wherein said means for altering comprise plugboards, there being at least one plugboard for each actuator station.

21. Apparatus according to claim 20, wherein said control means and plugboards are located together in said aircraft at a location remote from said control panel and said actuator stations.

22. Apparatus according to claim 17, including means for indicating the flight restrictions imposed on said aircraft by said weapons, said last named means being located in said cockpit and responsive to the output of said control means.

23. Apparatus for controlling at least one actuator station, said station being adapted to actuate a replaceable store in at least one of a plurality of operational modes, comprising means for displaying each of said operational modes and control means for determining the display of said display means, means for programming said control means to enable variation of said display when a store is changed, and means responsive to said control means for permitting activation of said store in accordance with any one of said operational modes.

24. Apparatus for use in controlling the operation of a plurality of stations, each of said stations being adapted to actuate an associated store such as a weapon or the like in accordance with at least one of a plurality of operational modes, comprising electrical control means for controlling the operation of said stations by means of the circuitry of said control means, means for altering the circuitry of said control means depending upon the respective stores located at said stations, means electrically responsive to said control means and connected to the circuitry thereof for displaying selected ones of a plurality of legends, said selected legends representing, respectively, the identity of said stores, station selection switch means associated with said stations for enabling the operation of a store at at least one selected station, means electrically connected to the circuitry of said control means and responsive to said station selection switch means for displaying selected ones of an additional plurality of legends, said selected additional legends representing the available operational modes of the store associated with said selected station, and mode selection means for enabling said control means to cause said selected station to operate its associated store in accordance with at least a selected one of said available modes.

25. Display apparatus for use in monitoring the operation of a plurality of stations, each of said stations being adapted to actuate an associated store such as a weapon or the like in accordance with at least one of a plurality of operational modes, comprising electrical control means, means for altering the circuitry of said control means depending upon the respective stores located at said stations, means electrically responsive to said control means and connected to the circuitry thereof for displaying selected ones of a plurality of legends, said selected legends representing, respectively, the identity of said stores, station selection switch means associated with said stations for selecting a store at at least one of said stations for operation, and means electrically connected to the circuitry of said control means for displaying selected ones of an additional plurality of legends, said selected additional legends represnting the available operational modes of the selected store.

26. Apparatus for use in controlling the operation of a plurality of stations, each of said stations being adapted to actuate an associated store such as a weapon or the like in accordance with at least one of a plurality of operational modes, comprising electrical control means, means for altering the circuitry of said control means depending upon the respective stores located at said stations, means electrically responsive to said control means and connected to the circuitry thereof for displaying selected ones of a plurality of legends, said selected legends representing, respectively, the identity of said stores, means electrically connected to the circuitry of said control means for displaying selected ones of an additional plurality of legends, said selected additional legends representing the available operational modes of the store associated with at least one selected station, and mode selection means for enabling said control means to cause said selected station to operate its associated store in accordance with at least a selected one of said available modes.

27. A device according to claim 26, including means for indicating the operational status of the store at each of said stations.

28. Display apparatus according to claim 25, including means electrically responsive to said control means for indicating the operational status of the store at each of said stations.

29. Apparatus for use in controlling the operation of a plurality of stations, each of said stations being adapted to actuate an associated store such as a weapon or the like in accordance with at least one of a plurality of operational modes, comprising electrical control means for controlling the operation of said stations by means of the circuitry of said control means, means for altering the circuitry for said control means depending upon the respective stores located at said stations, station selection switch means associated with said stations for enabling the operation of a store at at least one selected station, means electrically connected to the circuitry of said control means for displaying selected ones of a plurality of legends, said selected plurality of legends representing the available operational modes of the store associated with said selected station, and mode selection means for enabling said control means to cause said selected station to operate its associated store in accordance with at least a selected one of said available modes.

References Cited

UNITED STATES PATENTS

| | | | |
|---|---|---|---|
| 2,144,957 | 1/1939 | Bell | 89—1.5 |
| 2,351,336 | 6/1944 | Hooven | 89—1.5 |
| 2,396,197 | 3/1946 | Peterson | 89—1.5 |
| 2,421,893 | 6/1947 | Lambert et al. | 89—1.814 X |
| 2,845,004 | 7/1958 | Johnson | 89—1.815 |
| 2,866,385 | 12/1958 | Miller | 89—1.8 X |
| 3,021,758 | 2/1962 | Sholtz | 89—1.5 |
| 3,211,057 | 10/1965 | White et al. | 89—1.5 |
| 3,242,593 | 3/1966 | Brenegan | 89—1.8 X |

SAMUEL W. ENGLE, Primary Examiner

U.S. Cl. X.R.

89—1.8, 1.814

FO-1050
(5/69)

UNITED STATES PATENT OFFICE
CERTIFICATE OF CORRECTION

Patent No. 3,499,363                    Dated March 10, 1970

Inventor(s) Michael J. Lauro, Assignor to Fairchild-Hiller Corp.

It is certified that error appears in the above-identified patent and that said Letters Patent are hereby corrected as shown below:

Col. 5, after line 42, insert --aircraft.--
Col. 8, line 11, for "new" read --now--.
Col. 9, line 31, after "any" insert --one--.
Col. 14, line 44, for "applied" read --applies--.
Claim 19, col. 17, line 74, for "positioning" read --positioned--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents